US010180559B2

(12) United States Patent
Nolan et al.

(10) Patent No.: US 10,180,559 B2
(45) Date of Patent: Jan. 15, 2019

(54) LENS CELL PRELOADING SYSTEMS AND METHODS

(71) Applicant: FLIR Systems, Inc., Wilsonville, OR (US)

(72) Inventors: John Nolan, North Billerica, MA (US); Sean L. Delaney, North Billerica, MA (US)

(73) Assignee: FLIR Systems, Inc., Wilsonville, OR (US)

( * ) Notice: Subject to any disclaimer, the term of this patent is extended or adjusted under 35 U.S.C. 154(b) by 0 days.

(21) Appl. No.: 15/163,575

(22) Filed: May 24, 2016

(65) Prior Publication Data

US 2016/0356981 A1 Dec. 8, 2016

Related U.S. Application Data

(60) Provisional application No. 62/170,659, filed on Jun. 3, 2015.

(51) Int. Cl.
| | |
|---|---|
| G02B 7/04 | (2006.01) |
| H04N 7/18 | (2006.01) |
| G02B 7/02 | (2006.01) |
| G02B 27/64 | (2006.01) |
| G02B 7/09 | (2006.01) |
| G02B 7/08 | (2006.01) |
| G02B 7/10 | (2006.01) |

(52) U.S. Cl.
CPC .............. *G02B 7/04* (2013.01); *G02B 7/021* (2013.01); *G02B 7/026* (2013.01); *G02B 27/646* (2013.01); *G02B 7/08* (2013.01); *G02B 7/09* (2013.01); *G02B 7/10* (2013.01); *H04N 7/183* (2013.01)

(58) Field of Classification Search
CPC ...................... G02B 7/04–7/102; H04N 7/183
USPC .................................. 359/809, 819, 821–827
See application file for complete search history.

(56) References Cited

U.S. PATENT DOCUMENTS

| | | | | |
|---|---|---|---|---|
| 1,331,978 | A * | 2/1920 | Brock, Jr. .............. | G02B 27/64 33/1 A |
| 4,269,479 | A * | 5/1981 | Hamatani ................ | G02B 7/04 359/704 |
| 4,585,313 | A * | 4/1986 | Iwata ....................... | G02B 7/10 359/696 |
| 4,707,083 | A * | 11/1987 | Iizuka ...................... | G02B 7/04 359/700 |
| 5,671,088 | A * | 9/1997 | Mai .......................... | F41G 1/38 359/422 |
| 2006/0077576 | A1* | 4/2006 | Kasha .................... | G02B 7/021 359/819 |
| 2013/0199407 | A1* | 8/2013 | East ........................ | B61F 5/122 105/157.1 |

(Continued)

*Primary Examiner* — Jordan Schwartz
*Assistant Examiner* — George G King
(74) *Attorney, Agent, or Firm* — Haynes and Boone, LLP (57) ABSTRACT

Various embodiments of the present disclosure may include an imaging system with an optical device. The optical device may include a cam tube and a lens cell. The lens cell may be pre-loaded and centered within the cam tube by a plurality of springs and a plurality of bearings. The bearings may form a bearing surface to allow the lens cell to translate within the cam tube. The bearing may include a connector that stabilizes the bearing. The connector may allow for smoother translation of the lens cell within the cam tube.

19 Claims, 9 Drawing Sheets

(56) References Cited

U.S. PATENT DOCUMENTS

2014/0128679 A1\* 5/2014 Wieters .............. A61B 1/00096
600/170

\* cited by examiner

LENS CELL PRELOADING SYSTEMS AND METHODS

CROSS-REFERENCE TO RELATED APPLICATIONS

This application claims priority to and the benefit of U.S. Provisional Patent Application No. 62/170,659 filed Jun. 3, 2015 and entitled "IMPROVED LENS CELL PRELOADING SYSTEMS AND METHODS" which is hereby incorporated by reference in its entirety.

TECHNICAL FIELD

One or more embodiments of the invention relate generally to imaging devices and more particularly to, for example, preloading a lens cell within the imaging device.

BACKGROUND

In certain instances, it may be desirable to stabilize a lens cell within a camera. For example, the lens cell may be within a camera or other imaging device mounted on an aircraft or other mobile platform, such as a helicopter. Operating helicopters create vibrations that may vibrate the camera or imaging device and typically the camera may be mounted within a stabilized gimbal. However, a stabilized gimbal may not sufficiently reduce the vibration and/or motion and thus improved techniques are needed.

SUMMARY

Systems and methods are disclosed herein providing an approach for stabilizing a lens cell of a camera in accordance with one or more embodiments. In one embodiment, an apparatus including a lens cell, a plurality of bearings, and a plurality of springs may be provided. The lens cell may include a housing, including a plurality of bearing areas, configured to receive an optical component. Each of the plurality of bearings may include a front surface and a back surface and each bearing may include at least two pads and a connector connecting the two pads. Each of the plurality of springs may include a first end and a second end such that the first end is configured to contact one of the bearing areas and the second end is configured to contact a back surface of one of the bearings.

In another embodiment, a method may be provided. The method may include transmitting, with a plurality of springs, a plurality of forces onto a plurality of bearings such that each bearing comprises at least two pads and a connector connecting the two pads and contacts a bearing area of a lens cell, stabilizing the bearings through the connector connecting the at least two pads, and holding, due to the forces transmitted, the lens cell substantially centered within an inner tube of a cam tube.

In yet another embodiment, a further method may be provided. Such a method may include placing a plurality of springs into a plurality of bearing areas on a housing of a lens cell such that placing each of the plurality of springs includes contacting a respective bearing area with the spring, placing a plurality of bearings onto the springs such that placing each of the plurality of bearings includes contacting at least one respective spring with the bearing, and inserting the lens cell into a cam tube.

The scope of the invention is defined by the claims, which are incorporated into this section by reference. A more complete understanding of embodiments of the invention will be afforded to those skilled in the art, as well as a realization of additional advantages thereof, by a consideration of the following detailed description of one or more embodiments. Reference will be made to the appended sheets of drawings that will first be described briefly.

BRIEF DESCRIPTION OF THE DRAWINGS

Embodiments of the invention and their advantages are best understood by referring to the detailed description that follows. It should be appreciated that like reference numerals are used to identify like elements illustrated in one or more of the figures.

DETAILED DESCRIPTION

Techniques and mechanisms are provided to pre-load a lens cell within an optical device in accordance with one or more embodiments. For example, in a certain embodiment, the lens cell may be pre-loaded by springs. The springs may press against the lens cell on one side, and press against a bearing on the other side. The bearings may provide a surface for smooth translation of the lens cell within a cam tube of the optical device. For stability, the bearing may include at least two pads connected by a connector.

In some embodiments, the disclosed techniques and mechanisms may be utilized by any type of optical imaging system such as a telescope, binoculars, a visual imaging system, and/or an infrared imaging system. A certain such embodiment may utilize the pre-loaded lens cell within an optical device installed in an imaging system that is subjected to vibrations. Examples of such imaging systems include cameras installed on helicopters, airplanes, automobiles, and other vehicles. The pre-loaded lens cell may reduce radial play of the lens cell, resulting in more stable and/or clearer images. Additionally, the bearings may be shaped to reduce or eliminate shocks when changing the focus and/or zoom of the optical device through, for example, telescoping.

Figure 1:
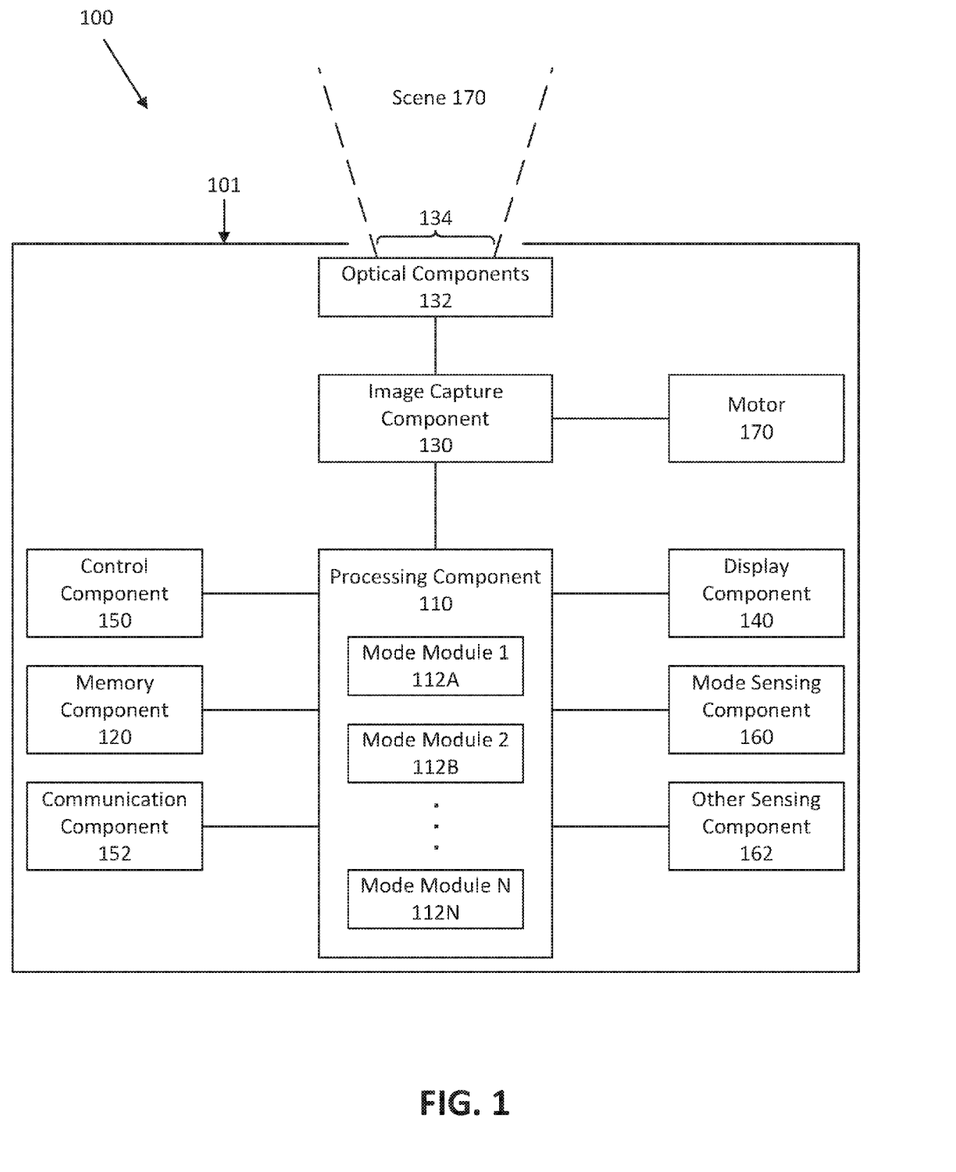
FIG. 1 illustrates a block diagram of an imaging system in accordance with an embodiment of the disclosure.

FIG. 1 illustrates a block diagram of an imaging system 100 in accordance with an embodiment of the disclosure. Imaging system 100 may be used to capture and process image frames in accordance with various techniques described herein. In one embodiment, various components of imaging system 100 may be provided in a housing 101, such as a housing of a camera, a personal electronic device (e.g., a mobile phone), or other system. In another embodiment, one or more components of imaging system 100 may be implemented remotely from each other in a distributed fashion (e.g., networked or otherwise).

In one embodiment, imaging system 100 includes a processing component 110, a memory component 120, an image capture component 130, optical components 132 (e.g., one or more lenses configured to receive electromagnetic radiation through an aperture 134 in the housing 101 and pass the electromagnetic radiation to the image capture component 130), a display component 140, a control component 150, a communication component 152, a mode sensing component 160, a sensing component 162, and a motor 170.

In various embodiments, imaging system 100 may be implemented as an imaging device, such as a camera, to capture image frames, for example, of a scene 170 (e.g., a field of view). Imaging system 100 may represent any type of camera system which, for example, detects electromagnetic radiation (e.g., irradiance or visual light) and provides representative data (e.g., one or more still image frames or video image frames). For example, imaging system 100 may represent a camera that is directed to detect one or more ranges (e.g., wavebands) of electromagnetic radiation and provide associated image data. Imaging system 100 may be a portable device and may be implemented, for example, as a handheld device and/or coupled, in other examples, to various types of vehicles (e.g., a land-based vehicle, a watercraft, an aircraft, a spacecraft, or other vehicle) or to various types of fixed locations (e.g., a home security mount, a campsite or outdoors mount, or other location) via one or more types of mounts. In still another example, imaging system 100 may be integrated as part of a non-mobile installation to provide image frames to be stored and/or displayed.

Processing component 110 may include, for example, a microprocessor, a single-core processor, a multi-core processor, a microcontroller, a logic device (e.g., a programmable logic device configured to perform processing operations), a digital signal processing (DSP) device, one or more memories for storing executable instructions (e.g., software, firmware, or other instructions), and/or any other appropriate combination of processing device and/or memory to execute instructions to perform any of the various operations described herein. Processing component 110 is adapted to interface and communicate with components 120, 130, 140, 150, 160, and 162 to perform method and processing steps as described herein. Processing component 110 may include one or more mode modules 112A-112N for operating in one or more modes of operation (e.g., to operate in accordance with any of the various embodiments disclosed herein). In one embodiment, mode modules 112A-112N are adapted to define processing and/or display operations that may be embedded in processing component 110 or stored on memory component 120 for access and execution by processing component 110. In another aspect, processing component 110 may be adapted to perform various types of image processing techniques as described herein.

In various embodiments, it should be appreciated that each mode module 112A-112N may be integrated in software and/or hardware as part of processing component 110, or code (e.g., software or configuration data) for each mode of operation associated with each mode module 112A-112N, which may be stored in memory component 120. Embodiments of mode modules 112A-112N (i.e., modes of operation) disclosed herein may be stored as a machine readable medium in a non-transitory manner (e.g., within a memory, a hard drive, a compact disk, a digital video disk, or a flash memory) to be executed by a computer (e.g., logic or processor-based system) to perform various methods disclosed herein.

In various embodiments, the machine readable medium may be included as part of imaging system 100 and/or separate from imaging system 100, with stored mode modules 112A-112N provided to imaging system 100 by coupling the device storing the machine readable medium to imaging system 100 and/or by imaging system 100 downloading (e.g., via a wired or wireless link) the mode modules 112A-112N from the device storing the machine readable medium. In various embodiments, as described herein, mode modules 112A-112N provide for improved camera processing techniques for real time applications, wherein a user or operator may change the mode of operation depending on a particular application, such as an off-road application, a maritime application, an aircraft application, a space application, or other application. Additional mode modules may also be provided for different planned usages. For example, mode modules may be provided for an export application and an import application.

Memory component 120 includes, in one embodiment, one or more memory devices (e.g., one or more memories) to store data and information. The one or more memory devices may include various types of memory including volatile and non-volatile memory devices, such as RAM (Random Access Memory), ROM (Read-Only Memory), EEPROM (Electrically-Erasable Read-Only Memory), flash memory, or other types of memory. In one embodiment, processing component 110 is adapted to execute software stored in memory component 120 to perform various methods, processes, and modes of operations in a manner as described herein.

Image capture component 130 includes, in one embodiment, one or more sensors (e.g., any type visible light, infrared, or other type of detector, including a detector implemented as part of a focal plane array) for capturing image signals representative of an image, of scene 170. In one embodiment, the sensors of image capture component 130 provide for representing (e.g., converting) a captured thermal image signal of scene 170 as digital data (e.g., via an analog-to-digital converter included as part of the sensor or separate from the sensor as part of imaging system 100).

In certain embodiments, the motor 170 may be coupled to the image capture component 130. The motor 170 may move components within the image capture component 130. For example, the motor 170 may move a housing, a lens, a cam tube, or a lens cell of the image capture component 130.

Processing component 110 may be adapted to receive image signals from image capture component 130, process image signals (e.g., to provide processed image data), store image signals or image data in memory component 120, and/or retrieve stored image signals from memory component 120. Processing component 110 may be adapted to process image signals stored in memory component 120 to provide image data (e.g., captured and/or processed image data) to display component 140 for viewing by a user.

Display component 140 includes, in one embodiment, an image display device (e.g., a liquid crystal display (LCD)) or various other types of generally known video displays or monitors. Processing component 110 may be adapted to display image data and information on display component 140. Processing component 110 may be adapted to retrieve image data and information from memory component 120 and display any retrieved image data and information on display component 140. Display component 140 may include display electronics, which may be utilized by processing component 110 to display image data and information. Display component 140 may receive image data and information directly from image capture component 130 via processing component 110, or the image data and information may be transferred from memory component 120 via processing component 110.

In one embodiment, processing component 110 may initially process a captured thermal image frame and present a processed image frame in one mode, corresponding to mode modules 112A-112N, and then upon user input to control component 150, processing component 110 may switch the current mode to a different mode for viewing the processed image frame on display component 140 in the different mode. This switching may be referred to as applying the camera processing techniques of mode modules 112A-112N for real time applications, wherein a user or operator may change the mode while viewing an image frame on display component 140 based on user input to control component 150. In various aspects, display component 140 may be remotely positioned, and processing component 110 may be adapted to remotely display image data and information on display component 140 via wired or wireless communication with display component 140, as described herein.

Control component 150 includes, in one embodiment, a user input and/or interface device having one or more user actuated components, such as one or more push buttons, slide bars, rotatable knobs or a keyboard, that are adapted to generate one or more user actuated input control signals. Control component 150 may be adapted to be integrated as part of display component 140 to operate as both a user input device and a display device, such as, for example, a touch screen device adapted to receive input signals from a user touching different parts of the display screen. Processing component 110 may be adapted to sense control input signals from control component 150 and respond to any sensed control input signals received therefrom.

Control component 150 may include, in one embodiment, a control panel unit (e.g., a wired or wireless handheld control unit) having one or more user-activated mechanisms (e.g., buttons, knobs, sliders, or others) adapted to interface with a user and receive user input control signals. In various embodiments, the one or more user-activated mechanisms of the control panel unit may be utilized to select between the various modes of operation, as described herein in reference to mode modules 112A-112N. In other embodiments, it should be appreciated that the control panel unit may be adapted to include one or more other user-activated mechanisms to provide various other control operations of imaging system 100, such as auto-focus, menu enable and selection, field of view (FoV), brightness, contrast, gain, offset, spatial, temporal, and/or various other features and/or parameters. In still other embodiments, a variable gain signal may be adjusted by the user or operator based on a selected mode of operation.

In another embodiment, control component 150 may include a graphical user interface (GUI), which may be integrated as part of display component 140 (e.g., a user actuated touch screen), having one or more images of the user-activated mechanisms (e.g., buttons, knobs, sliders, or others), which are adapted to interface with a user and receive user input control signals via the display component 140. As an example for one or more embodiments as discussed further herein, display component 140 and control component 150 may represent appropriate portions of a smart phone, a tablet, a personal digital assistant (e.g., a wireless, mobile device), a laptop computer, a desktop computer, or other type of device.

Mode sensing component 160 includes, in one embodiment, an application sensor adapted to automatically sense a mode of operation, depending on the sensed application (e.g., intended use or implementation), and provide related information to processing component 110. In various embodiments, the application sensor may include a mechanical triggering mechanism (e.g., a clamp, clip, hook, switch, push-button, or others), an electronic triggering mechanism (e.g., an electronic switch, push-button, electrical signal, electrical connection, or others), an electromechanical triggering mechanism, an electro-magnetic triggering mechanism, or some combination thereof. For example for one or more embodiments, mode sensing component 160 senses a mode of operation corresponding to the imaging system's 100 intended application based on the type of mount (e.g., accessory or fixture) to which a user has coupled the imaging system 100 (e.g., image capture component 130). Alternatively, the mode of operation may be provided via control component 150 by a user of imaging system 100 (e.g., wirelessly via display component 140 having a touch screen or other user input representing control component 150).

Furthermore in accordance with one or more embodiments, a default mode of operation may be provided, such as for example when mode sensing component 160 does not sense a particular mode of operation (e.g., no mount sensed or user selection provided). For example, imaging system 100 may be used in a freeform mode (e.g., handheld with no mount) and the default mode of operation may be set to handheld operation, with the image frames provided wirelessly to a wireless display (e.g., another handheld device with a display, such as a smart phone, or to a vehicle's display).

Mode sensing component 160, in one embodiment, may include a mechanical locking mechanism adapted to secure the imaging system 100 to a vehicle or part thereof and may include a sensor adapted to provide a sensing signal to processing component 110 when the imaging system 100 is mounted and/or secured to the vehicle. Mode sensing component 160, in one embodiment, may be adapted to receive an electrical signal and/or sense an electrical connection type and/or mechanical mount type and provide a sensing signal to processing component 110. Alternatively or in addition, as discussed herein for one or more embodiments, a user may provide a user input via control component 150 (e.g., a wireless touch screen of display component 140) to designate the desired mode (e.g., application) of imaging system 100.

Processing component 110 may be adapted to communicate with mode sensing component 160 (e.g., by receiving sensor information from mode sensing component 160) and image capture component 130 (e.g., by receiving data and information from image capture component 130 and providing and/or receiving command, control, and/or other information to and/or from other components of imaging system 100).

In various embodiments, mode sensing component 160 may be adapted to provide data and information relating to system applications including a handheld implementation and/or coupling implementation associated with various types of vehicles (e.g., a land-based vehicle, a watercraft, an aircraft, a spacecraft, or other vehicle) or stationary applications (e.g., a fixed location, such as on a structure). In one embodiment, mode sensing component 160 may include communication devices that relay information to processing component 110 via wireless communication. For example, mode sensing component 160 may be adapted to receive and/or provide information through a satellite, through a local broadcast transmission (e.g., radio frequency), through a mobile or cellular network and/or through information beacons in an infrastructure (e.g., a transportation or highway information beacon infrastructure) or various other wired or wireless techniques (e.g., using various local area or wide area wireless standards).

In another embodiment, imaging system 100 may include one or more other types of sensing components 162, including environmental and/or operational sensors, depending on the sensed application or implementation, which provide information to processing component 110 (e.g., by receiving sensor information from each sensing component 162). In various embodiments, other sensing components 162 may be adapted to provide data and information related to environmental conditions, such as internal and/or external temperature conditions, lighting conditions (e.g., day, night, dusk, and/or dawn), humidity levels, specific weather conditions (e.g., sun, rain, and/or snow), distance (e.g., laser rangefinder), and/or whether a tunnel, a covered parking garage, or that some type of enclosure has been entered or exited. Accordingly, other sensing components 160 may include one or more conventional sensors as would be known by those skilled in the art for monitoring various conditions (e.g., environmental conditions) that may have an effect (e.g., on the image appearance) on the data provided by image capture component 130.

In some embodiments, other sensing components 162 may include devices that relay information to processing component 110 via wireless communication. For example, each sensing component 162 may be adapted to receive information from a satellite, through a local broadcast (e.g., radio frequency) transmission, through a mobile or cellular network and/or through information beacons in an infrastructure (e.g., a transportation or highway information beacon infrastructure) or various other wired or wireless techniques.

In various embodiments, components of imaging system 100 may be combined and/or implemented or not, as desired or depending on application requirements, with imaging system 100 representing various operational blocks of a system. For example, processing component 110 may be combined with memory component 120, image capture component 130, display component 140, and/or mode sensing component 160. In another example, processing component 110 may be combined with image capture component 130 with only certain operations of processing component 110 performed by circuitry (e.g., a processor, a microprocessor, a microcontroller, a logic device, or other circuitry) within image capture component 130. In still another example, control component 150 may be combined with one or more other components or be remotely connected to at least one other component, such as processing component 110, via a wired or wireless control device so as to provide control signals thereto.

In one embodiment, communication component 152 may be implemented as a network interface component (NIC) adapted for communication with a network including other devices in the network. In various embodiments, communication component 152 may include a wireless communication component, such as a wireless local area network (WLAN) component based on the IEEE 802.11 standards, a wireless broadband component, mobile cellular component, a wireless satellite component, or various other types of wireless communication components including radio frequency (RF), microwave frequency (MWF), and/or infrared frequency (IRF) components adapted for communication with a network. As such, communication component 152 may include an antenna coupled thereto for wireless communication purposes. In other embodiments, the communication component 152 may be adapted to interface with a DSL (e.g., Digital Subscriber Line) modem, a PSTN (Public Switched Telephone Network) modem, an Ethernet device, and/or various other types of wired and/or wireless network communication devices adapted for communication with a network.

In various embodiments, a network may be implemented as a single network or a combination of multiple networks. For example, in various embodiments, the network may include the Internet and/or one or more intranets, landline networks, wireless networks, and/or other appropriate types of communication networks. In another example, the network may include a wireless telecommunications network (e.g., cellular phone network) adapted to communicate with other communication networks, such as the Internet. As such, in various embodiments, the imaging system 100 may be associated with a particular network link such as for example a URL (Uniform Resource Locator), an IP (Internet Protocol) address, and/or a mobile phone number.

Figure 2:
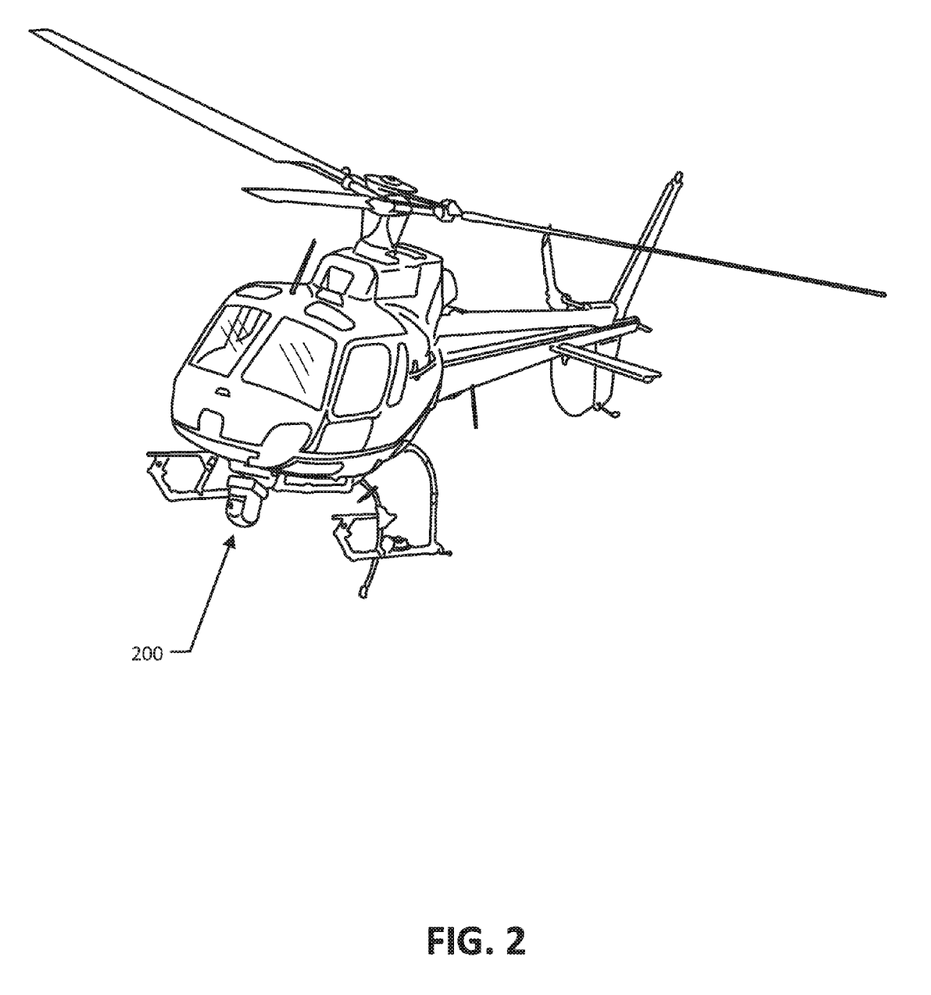
FIG. 2 illustrates an aircraft with a gimbal that includes an imaging system in accordance with an embodiment of the disclosure.

FIG. 2 illustrates an aircraft with a gimbal that includes an imaging system in accordance with an embodiment of the disclosure. The helicopter in FIG. 2 includes an imaging system 200. The imaging system 200 is housed within the gimbal. The gimbal is attached to an underside of the helicopter. The helicopter may vibrate during operation due to, for example, rotation of the rotors, operation of the powerplant, and/or buffeting from the wind.

The imaging system of the aircraft may include a lens cell. The lens cell may be mounted within the imaging system and be subjected to the vibrations experienced by the helicopter. In such situations, the vibrations may exert forces on the lens cell that may move the lens cell radially.

Additionally, the imaging system may include zoom functions. The imaging system may zoom by varying the distance between a plurality of lenses. At least one of the plurality of lenses may be housed within the lens cell. The distance between the plurality of lenses may be varied by translating at least one of the lenses in relation to another lens. In certain such embodiments, the lens cell may be translated within a cam tube. Smooth movement of the lens cell within the cam tube may also result in better quality images, especially for embodiments where the imaging system records video.

Figure 3A:
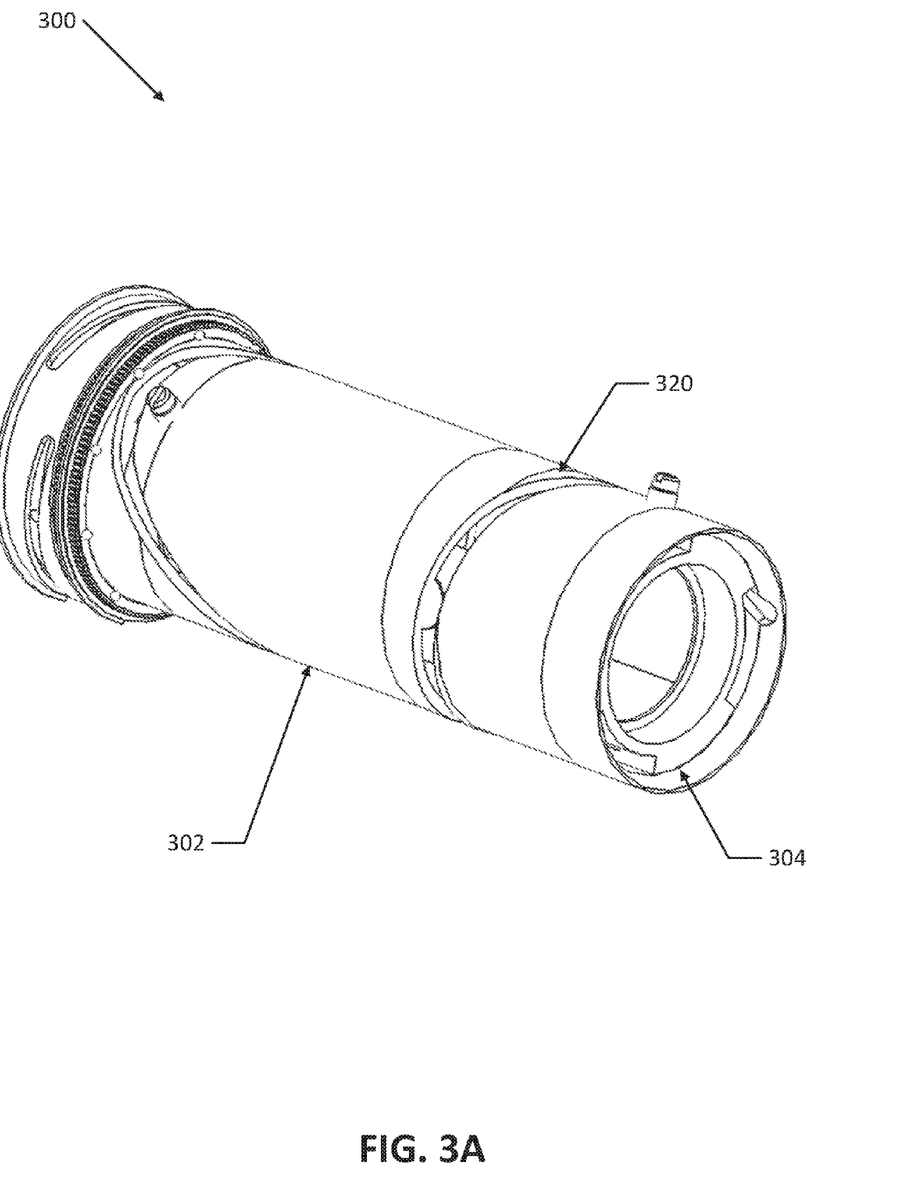
FIG. 3A illustrates an optical device with a pre-loaded lens cell in accordance with an embodiment of the disclosure.

A pre-loaded lens cell may be decrease or eliminate radial play of the lens cell. FIG. 3A illustrates an optical device with a pre-loaded lens cell in accordance with an embodiment of the disclosure. FIG. 3A may illustrate an optical device that may be incorporated within the optical components 132 or the image capture component 130 of the imaging system 100 of FIG. 1.

FIG. 3A includes an optical device 300 with a cam tube 302 and a lens cell 304. The outside of the cam tube 302 as well as the inner tube of the cam tube 302 in FIG. 3A is substantially cylindrical, but other embodiments of the optical device may include a cam tube with an outside and/or an inner tube of another geometry (square, rectangular, hexagonal, oval, octagonal, etc.) and a lens cell shaped to match the geometry of the inner tube.

The cam tube 302 may enclose the lens cell 304, i.e., the lens cell 304 may be contained within the cam tube 302. In certain embodiments, the lens cell 304 may not perfectly fit the cam tube 302. In other words, there may be a gap between the lens cell 304 and the cam tube 302 when the cam tube 302 contains the lens cell 304. The gap between the lens cell 304 and the cam tube 302 may result in radial play of the lens cell 304. For example, in the embodiment shown in FIG. 3A, the lens cell 304 may translate radially with the cam tube 302. Vibrations and other movement and forces experienced by the optical device 300 may induce such radial play.

In addition, the lens cell 302 may translate relative to the cam tube 304 in order to, for example, vary the zoom of the optical device 300. As an illustrative example, the cam tube 302 in FIG. 3A is a substantially cylindrical cam tube. The lens cell 304 in FIG. 3A may, when the optical device 300 is zooming into or zooming out of an image, translate from one end of the cam tube 302 towards another end of the cam tube 302 (such as from a position close to the right side of FIG. 3A to a position closer to the left side of the FIG. 3A). In the optical device 300 shown in FIG. 3A, the cam tube 302 may include a cam groove 320. In certain embodiments, the cam groove 320 may or may also be a groove within the inner tube of the cam tube. During translation, the lens cell 304 may transition across the cam groove 320.

Figure 3B:
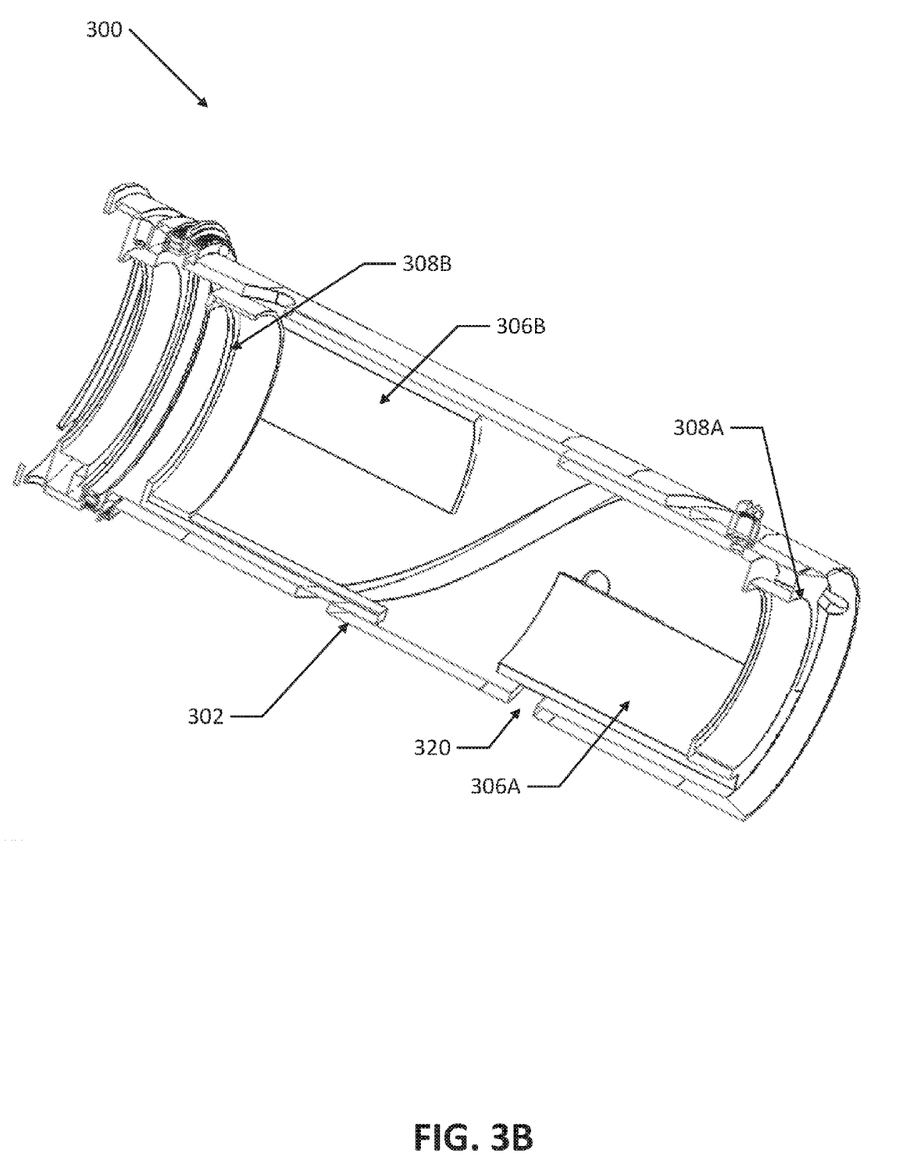
FIG. 3B illustrates a cutaway of the optical device of FIG. 3A in accordance with an embodiment of the disclosure.

The relationship between the lens cell 304 and the cam tube 302 is illustrated in further detail in FIG. 3B. FIG. 3B illustrates a cutaway of the optical device of FIG. 3A in accordance with an embodiment of the disclosure. The cutaway of the optical device 300 includes the cam tube 302 and the lens cell of FIG. 3A.

The optical device 300 in FIG. 3B includes two lens cells, each with a housing 306 and an optical component 308. To avoid confusion, the housings and optical components of the two lens cells have been labeled with "A" and "B" respectively. In certain embodiments, the two lens cells may include identical housings and/or optical components, but other embodiments may include different housings and/or optical components.

The optical components 308A and 308B may be any type of optical component used in imaging processing. Examples of appropriate optical components include lenses, filters, optical arrays, etc. The optical components 308A and 308B may be housed or received in housings 306A and 306B, respectively.

Housings 306A and 306B may translate relative to each other. By varying the distance between the housings 306A and 306B, and hence the distance between optical components 308A and 308B, the optical device 300 may zoom in on or zoom out of an image. One way of varying the distance between the two housings may be translating one or both of the lens cells within the cam tube 302. Accordingly, one or both of the lens cells may move inside of the cam tube 302. In certain embodiments, moving a lens cell may require the lens cell to transition across the cam groove 320. Transitioning across the cam groove 320 may transmit a shock on the lens cell.

Figure 4:
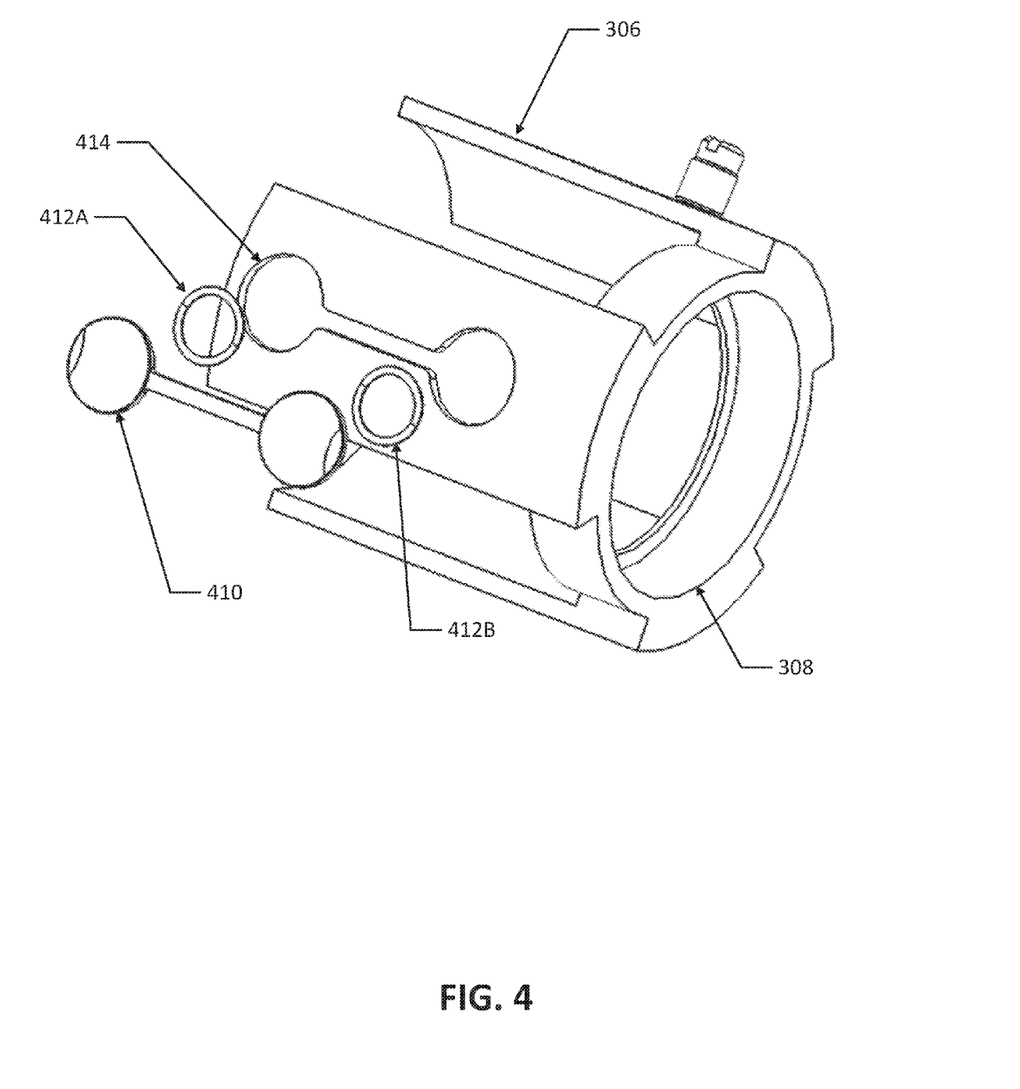
FIG. 4 illustrates an exploded view of a lens cell with a bearing and springs in accordance with an embodiment of the disclosure.

In certain embodiments, the optical device may include bearings and springs to pre-load to the lens cell. A configuration of such an optical device is shown in FIG. 4. FIG. 4 illustrates an exploded view of a lens cell with a bearing and springs in accordance with an embodiment of the disclosure.

FIG. 4 includes the housing 306 and the optical device 308 with a bearing 410 and springs 412A and 412B. In addition, the housing 306 in FIG. 4 includes a bearing recess 414.

FIG. 4 is an exploded view. The bearing recess 414 may be shaped to receive the bearing 410. The springs 412A and 412B may be positioned between the bearing recess 414 and the bearing 410. When the lens cell, along with the bearing and springs, is positioned within a cam tube (i.e., held within the inner tube of a cam tube), the springs may push the bearing against the inner wall of the cam tube. In certain embodiments, the springs may be torsion springs, coil springs, leaf springs, springs washers, compressible materials (foam, rubber, etc.), and other types of springs.

In certain embodiments, an optical device may include a plurality of bearings and springs, such as two, three, four, five, or six or more bearings. Each bearing may include one or more corresponding springs, such as one spring per bearing, two springs per bearing, three springs per bearing, or four or more springs per bearing. In the embodiment shown in FIG. 4, the bearing 410 includes two pads and a connector and each pad may contact a spring to press the pad against the inner tube of the cam tube. The connector may stabilize the two pads and minimize rotation, rocking, and/or wobbling of the bearings when the lens cell is translated within the cam tube. The bearing is described in further detail herein.

The plurality of bearings and springs may substantially center the lens cell within the inner tube of the cam tube through springs pushing on the bearing and the lens cell in multiple directions. The force from each individual spring may be visualized as a force vector, with the magnitude of the force vector increasing as the spring is compressed. A lens cell may be subjected to multiple force vectors and may, through the multiple force vectors, become centered within the cam tube. For example, a lens cell may include springs and bearings that are arranged 120 degrees apart in a substantially equiangular manner around a center axis of the optical component. In certain such embodiments, the springs and bearings may also be substantially equidistant from the center axis. Forces from the three springs may substantially center the lens cell. For the purposes of this disclosure, "substantially" may mean an item being within a range of 25% or less of a figure. Thus, "substantially center" may mean that the center axis of a cylindrical optical device of a lens cell may be a distance of 25% or less of the radius of a center axis of a cylindrical cam tube.

Figure 5:
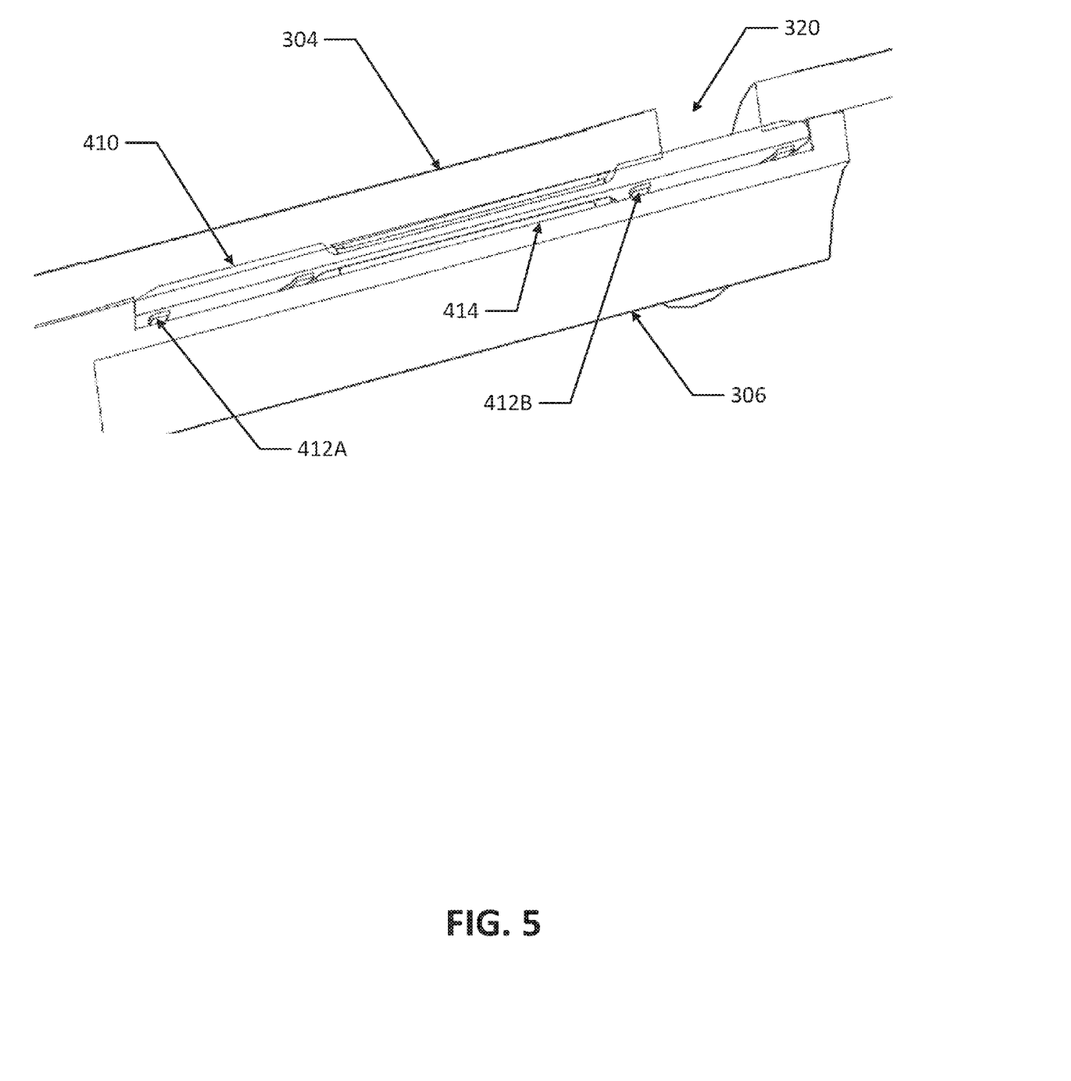
FIG. 5 illustrates a close up of a cutaway of an optical device with a pre-loaded lens cell in accordance with an embodiment of the disclosure.

An example of a bearing and spring pressing against a cam tube is illustrated in FIG. 5. FIG. 5 illustrates a close up of a cutaway of an optical device with a pre-loaded lens cell in accordance with an embodiment of the disclosure. FIG. 5 includes the cam tube 304, the lens cell 306, the bearing 410, and the springs 412A and 412B. The cam tube 304 includes the cam groove 320. The lens cell 306 includes the bearing recess 414.

FIG. 5 is a representative drawing. Accordingly, FIG. 5 may show interference between components when, in actual implementation, there may be no interference between the components. Instead, another component, such as the spring, may be compressed to avoid interference between the components.

In FIG. 5, the lens cell 306 may be located within the cam tube 304. The springs 412A and 412B and the bearing 410 may be housed within the bearing recess 414. In the embodiment shown in FIG. 5, the distance between the inner tube of the cam tube 304 and the bottom of the bearing recess 414, when the lens cell 306 is centered within the inner tube of the cam tube 304, may be less than the sum of the thickness of one of the pads of the bearing 410 and the uncompressed length of a spring. Accordingly, when the lens cell 306 is housed within the inner tube of the cam tube 304, the springs 412A and 412B may contact a back surface of the bearing 410 and may be compressed to fit the bearing 410 and the springs 412A and 412B in the space between the inner tube of the cam tube 304 and the bearing recess 414.

Compression of the springs 412A and 412B may result in the spring exerting a force on the bearing 410 at one end and on the lens cell 306 at the other end. In contrast to pre-loading the lens cell with just springs, positioning the bearing 410 between the springs and the lens cell may allow the lens cell 306 to smoothly translate within the cam tube 304. A top surface of the bearing 410 (the surface of the bearing closer to the inner tube) may press against the inner tube while the lens cell 306 may be pushed towards the bottom of FIG. 5 and thus be substantially centered within the cam tube 304. The top surface of the bearing 410 may be low friction (such as through a low friction coating), or the entire bearing 410 may be made from a low friction material, such as Teflon, bronze, nylon, PTFE, graphite, nickel, and other low friction plastics and metals to allow the bearing 410 to smoothly slide along the inner wall of the cam tube 304. Low friction may be any type of material with a static or dynamic coefficient of friction that is in an acceptable range for use with the drive system, the inner wall of the cam tube 304, the lens cell 306, and/or the bearings.

The cam tube 304 in FIG. 5 may include the cam groove 320. The cam groove 320 may be a gap or notch on the inside of the cam tube 304. In certain embodiments, the gap of the cam groove 320 may impart a shock to the bearing 410 when the bearing 410 transitions across the cam groove (i.e., when the lens cell 306 translates relative to the cam groove 304 to zoom in or out of an image). The shock may be transferred to the lens cell 306 and thus may affect the image quality of an image or images captured by the lens cell 306.

In the embodiment of the optical device shown in FIG. 5, the bearing 410 may include features designed to help the bearing 410 smoothly transition across the cam groove 304 when the lens cell 306 is translating relative to the cam tube 304. Such figures are described in further detail herein and may include chamfered lead-ins, and a pad that is longer than the width of the cam groove to ensure that a portion of the pad is contacting the inner tube of the cam tube 304 even when the bearing 410 (and hence, the pad) is transitioning across the cam groove 320.

Figure 6:
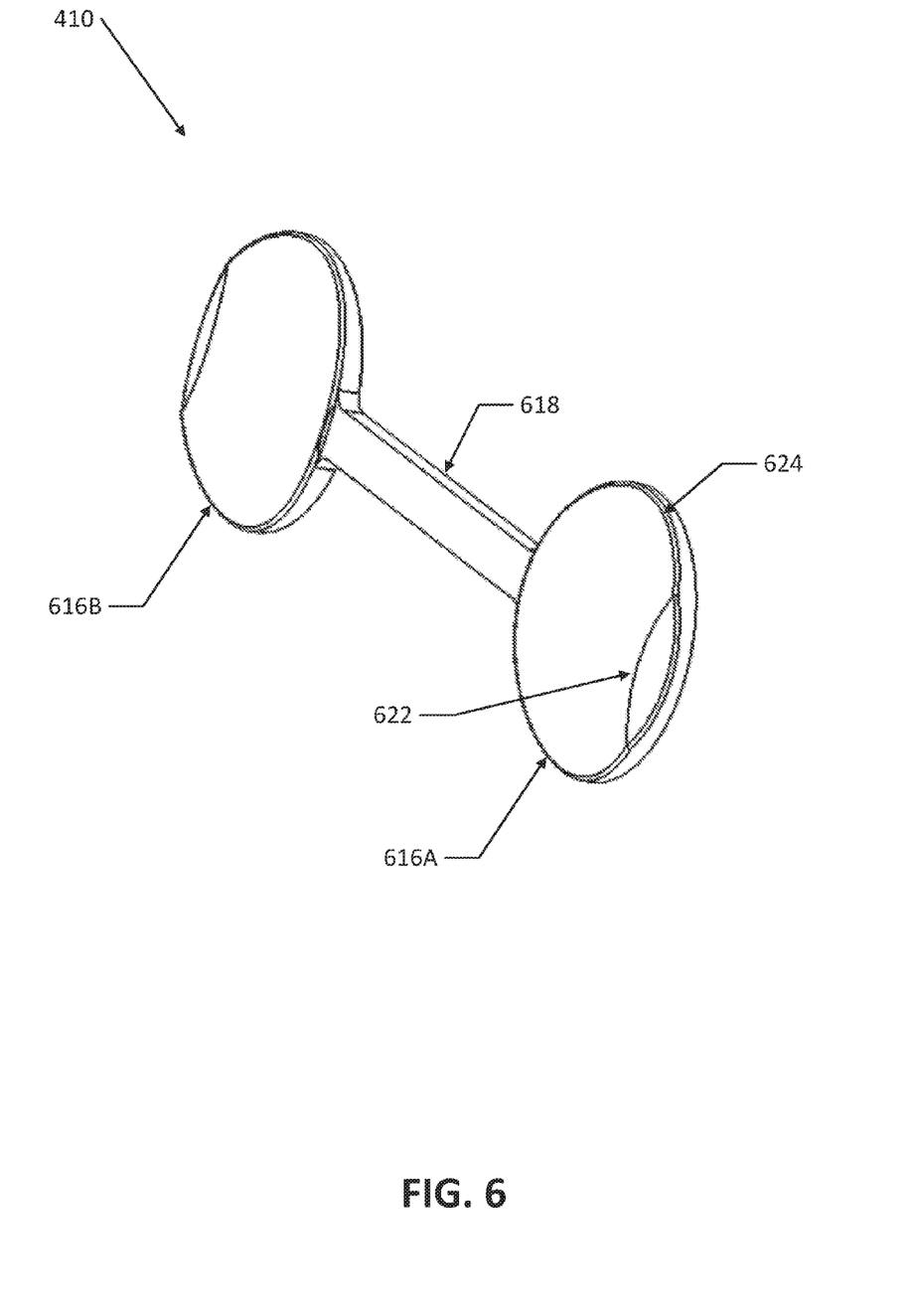
FIG. 6 illustrates a bearing in accordance with an embodiment of the disclosure.

Features of the bearing 410 are described further in FIG. 6. FIG. 6 illustrates a bearing in accordance with an embodiment of the disclosure. The bearing 410 in FIG. 6 includes pads 616A and 616B and a connector 618.

The connector 618 connects the pads 616A and 616A. The connector 618 may extend the effective length of the bearing 410. The bearing 410 may be designed to translate along the major length (i.e., the direction that the bearing 410 is longer). In certain embodiments, the connector 618 may increase the effective major length of the bearing 410, or any other desired length of the bearing, and thus may stabilize the pads of the bearing 410 and help minimize rotation, rocking, and/or wobbling of the bearing 410 when the bearing 410 is moved, such as during translation of the lens cell within the cam tube. In the embodiment shown in FIG. 6, the pads 616A and 616B may be substantially circular while the connector 618 may be a thin rectangular strip connecting the pads 616A and 616B. However, it is appreciated that in other embodiments, the pads 616A and 616B may be other geometries such as rectangular, triangular, hexagonal, octagonal, trapezoidal, and other regular or irregular geometries. The connector 618 may likewise be other geometries. In fact, while the connector 618 in FIG. 6 is thinner than the pads 616A and 616B, in other embodiments, the connector may not be thinner. In certain such embodiments, the bearing may be, for example, an obround shape where there is no distinctive transition between the connector and pads.

Referring back to the pads 616A and 616B, lead-in angles may be present on the pads or on other parts of the bearing. The pad 616A of the bearing 410 includes a chamfer 624. The pad 616 includes the chamber 624 around the entire perimeter of its top surface. Configurations with a chamber or rounded edge around the entire perimeter of the top surface may decrease the likelihood of the pad getting caught on an edge or surface of the cam tube.

The pad 616A also includes a lead-in 622. The lead-in 622 may be an angled chamfer or may be, in other embodiments, a rounded edge or other geometric feature to decrease the likelihood of the pad getting caught on an edge or surface of the cam tube when the lens cell is translating relative to the cam tube. Accordingly, the lead-in 622 may be placed to decrease shocks resulting from a direction of travel of the lens cell. Furthermore, the lead-in 622 may help transition the lens cell across any cam grooves by angling in the leading edge that contacts an edge formed by the cam groove.

In FIG. 6, the top surface of the bearing 410 may be curved. The top surface may be curved since the inner tube of the cam tube may include a curved surface (i.e., due to the cylindrical shape of the inner tube). Accordingly, the top surface of the bearing may be curved to match the curvature of the inner tube of the cam tube. In other embodiments, the inner tube of the cam tube may not be curved. In such embodiments, the top surface may still be curved or may not be curved. The top surface may also be straight, curved in a concave fashion, or curved in a convex fashion in other embodiments. For example, a top surface may include a concave curve to match a corresponding convex curvature of an inner tube to better center a lens cell by, for example, reducing or eliminating linear movement of the lens cell in unwanted directions.

Figure 7:
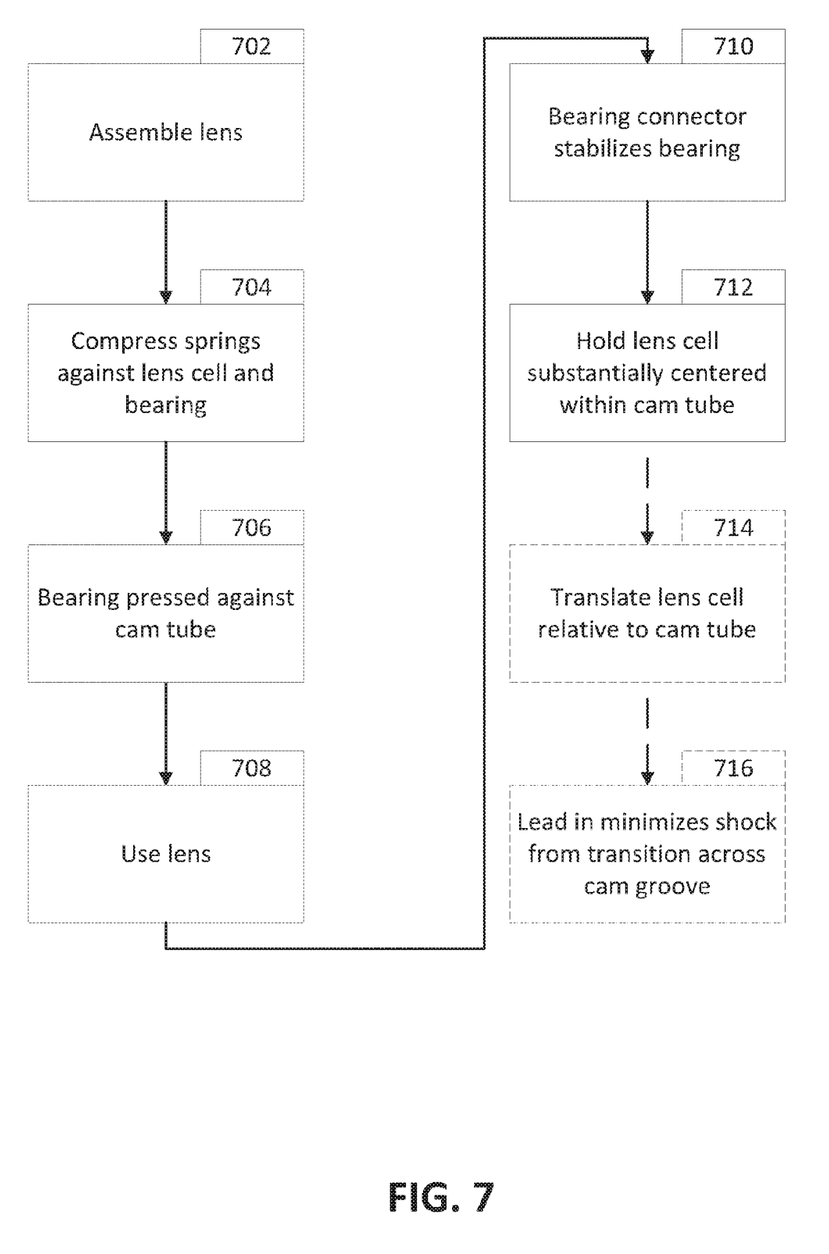
FIG. 7 illustrates a flowchart of a process of operating an optical device with a pre-loaded lens cell in accordance with an embodiment of the disclosure.

Operation of an optical device with a pre-loaded lens cell including a bearing as described in FIG. 6 may be further detailed in FIG. 7. FIG. 7 illustrates a flowchart of a process of operating an optical device with a pre-loaded lens cell in accordance with an embodiment of the disclosure.

In step 702, a part of an optical device may be assembled. The optical device may include a lens that may be inserted into a housing to form a lens cell. In step 704, the lens cell with bearings and springs may be inserted into the inner tube of a cam tube. The springs connected to the bearings and lens cell may be compressed when the lens cell is inserted into the cam tube. In step 706, force from the spring presses the bearing against a wall of the inner tube of the cam tube.

In step 708, the optical device may be in operation due to inputs by a user or a computer program. During operation of the optical device, the lens cell may be subjected to shocks or vibrations via, for example, vibrations of a motor on a vehicle that the optical device is mounted on.

In step 710, the bearing connector stabilizes the bearing. The bearing connector may minimize or decrease rotation, rocking, and/or wobbling of the bearings. In step 712, the lens cell may be substantially centered within the cam tube due to the force from the spring. Centering the lens cell within the cam tube may result in higher quality images captured by the optical device.

In certain embodiments, the lens cell may translate relative to the cam tube, such as described in optional step 714. The lens cell may translate if, for example, the optical device zooms in or out of an image. When the lens cell translates, optional step 716 may minimize shock of the translation that results from the lens cell transitioning across the cam groove by, for example, using lead-in features on the bearing, as described in FIG. 6.

Figure 8:
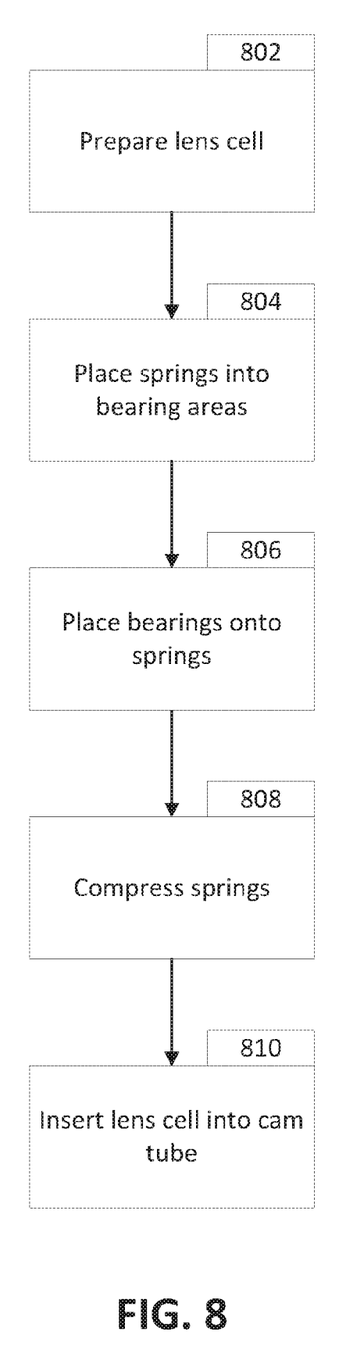
FIG. 8 illustrates a flowchart of a process of assembling an optical device with a pre-loaded lens cell in accordance with an embodiment of the disclosure.

FIG. 8 illustrates a flowchart of a process of assembling an optical device with a pre-loaded lens cell in accordance with an embodiment of the disclosure. In step 802, the lens cell is prepared for assembly. As part of assembly preparation, the housing of the lens cell may be produced through casting, machining, forming, autoclaving, lay-up, or other processes. The optical components may also be produced through lens grinding and other processes. Additionally, the optical components may be assembled to the housings, such as through press fitting.

In step 804, the springs may be inserted into areas adapted to receive the springs. The springs may be, for example, inserted into a bearing recess. Each spring may be inserted into its own respective bearing area or bearing recess.

In step 806, the bearings may be placed onto corresponding springs. In certain embodiments, the bearings may also be inserted into respective bearing recesses. In other words, the bearing recesses of such embodiments may be adapted to receive both the spring(s) and the bearing that the spring(s) support. Such an embodiment may be shown in FIG. 4, where the bearing recess 414 is a barbell shape and is adapted to receive the barbell shaped bearing 410.

After the springs and bearings are positioned, the springs may be compressed in step 808. In such embodiments, compression of the spring may be helpful in assembling the lens cell as, on uncompressed springs, the bearings may sit too far from the surface of the lens cell to fit into the cam tube. Accordingly, the springs may be compressed to allow the lens cell with the springs and bearings to fit into the cam tube. In certain embodiments, the spring may be compressed through forces applied to the bearings.

In step 810, the assembled combination of the lens cell, the springs, and the bearings are inserted into the cam tube. Additionally, the lens cell may be positioned and connected to certain mechanisms within the housing. For example, the lens cell may be connected to gears, pulleys, or other mechanisms that may control translation of the lens cell within the cam tube. Afterwards, the lens cell may thus be able to translate within the cam tube to zoom in and out of images.

Where applicable, various embodiments provided by the present disclosure can be implemented using hardware, software, or combinations of hardware and software. Also where applicable, the various hardware components and/or software components set forth herein can be combined into composite components comprising software, hardware, and/or both without departing from the spirit of the present disclosure. Where applicable, the various hardware components and/or software components set forth herein can be separated into sub-components comprising software, hardware, or both without departing from the spirit of the present disclosure. In addition, where applicable, it is contemplated that software components can be implemented as hardware components, and vice-versa.

Software in accordance with the present disclosure, such as non-transitory instructions, program code, and/or data, can be stored on one or more non-transitory machine readable mediums. It is also contemplated that software identified herein can be implemented using one or more general purpose or specific purpose computers and/or computer systems, networked and/or otherwise. Where applicable, the ordering of various steps described herein can be changed, combined into composite steps, and/or separated into sub-steps to provide features described herein.

Embodiments described above illustrate but do not limit the invention. It should also be understood that numerous modifications and variations are possible in accordance with the principles of the invention. Accordingly, the scope of the invention is defined only by the following claims.

What is claimed is:

1. An apparatus comprising:
    a lens cell comprising a housing configured to receive an optical component, wherein the housing includes a plurality of bearing areas; a plurality of bearings, each bearing including a front surface and a back surface and comprising at least two pads and a connector connecting the two pads, wherein a maximum thickness of the pads is greater than a maximum thickness of the connector and a maximum width of the pads is greater than a maximum width of the connector; and
    a plurality of springs, each spring including a first end and a second end such that the first end is configured to contact one of the bearing areas, and the second end is configured to contact a back surface of one of the bearings.

2. The apparatus of claim 1, wherein the optical component comprises a substantially cylindrical cross-section and wherein the plurality of bearings comprises at least three bearings arranged substantially equiangular around an axis of the optical component and substantially equidistant from the axis.

3. The apparatus of claim 1 further comprising a tubular cam tube configured to enclose the lens cell within an inner tube of the cam tube, wherein the lens cell is configured to translate relative to the cam tube along an axis of the optical component, wherein the bearing is configured to translate, with the lens cell, along a major length of the bearing, and wherein the connector is disposed between the pads along the major length.

4. The apparatus of claim 1, further comprising the optical component.

5. The apparatus of claim 1, wherein the plurality of bearings comprises at least three bearings and the plurality of springs comprises at least six springs.

6. The apparatus of claim 1, wherein the housing further comprises a plurality of bearing recesses, each bearing recess configured to house a bearing and at least one spring.

7. The apparatus of claim 1, further comprising:
    a tubular cam tube configured to enclose the lens cell within an inner tube of the cam tube, wherein each bearing further comprises an angled lead in on a side of the front surface and the front surface of each bearing is configured to contact a portion of the inner tube of the cam tube; and
    a motor configured to move the lens cell and/or the cam tube, wherein the inner tube of the cam tube includes a cam groove.

8. The apparatus of claim 1, wherein the pads are substantially circular and the connector is a rectangular strip connecting the pads.

9. The apparatus of claim 1, further comprising the optical component, wherein the optical component is selected from the group consisting of: a lens, a filter, an imaging array, a sensor, and an aperture.

10. The apparatus of claim 1, wherein the springs are coil springs and/or spring washers, wherein an axis of each of the coil spring and/or spring washer is configured to intersect a portion of one of the pads, wherein the portion of each of the pads is configured to contact a portion of an inner tube of a cam tube, and wherein the axis is offset from the connector.

11. A mobile vehicle comprising the apparatus of claim 1, the mobile vehicle further comprising:
 a vehicle body;
 an engine;
 a gimbal coupled to the vehicle body; and
 an imaging system comprising an optical device, wherein the optical device comprises the apparatus and at least a portion of the optical device is coupled to the gimbal, wherein the mobile vehicle is a helicopter, an airplane, a boat, a hovercraft, an automobile, a tracked vehicle, or a motorcycle and the engine is configured to power the mobile vehicle.

12. A method comprising:
 transmitting, with a plurality of springs contacting at least one bearing area of a lens cell, a plurality of forces onto a plurality of bearings, wherein each bearing comprises two pads and a connector connecting the two pads, and wherein a maximum thickness of the pads is greater than a maximum thickness of the connector and a maximum width of the pads is greater than a maximum width of the connector;
 stabilizing the bearings through the connector connecting the pads; and
 holding, due to the forces transmitted, the lens cell substantially centered within an inner tube of a cam tube.

13. The method of claim 12, further comprising receiving, with the cam tube, vibrations and holding the lens cell substantially centered within the inner tube of the cam tube when the cam tube is vibrated.

14. The method of claim 12, wherein the stabilizing the bearings comprises minimizing rotation, rocking, and/or wobbling of the bearings.

15. The method of claim 12, wherein the lens cell comprises a substantially cylindrical optical component and the method further comprises translating the lens cell relative to the cam tube along an axis of the optical component.

16. The method of claim 15, wherein the inner tube of the cam tube includes at least one cam groove and the method further comprises minimizing rotation, rocking, and/or wobbling of the lens cell when the lens cell is translated relative to the cam tube.

17. A method comprising:
 placing a plurality of springs into a plurality of bearing areas on a housing of a lens cell, wherein placing each of the plurality of springs comprises contacting a respective bearing area with the spring;
 placing a plurality of bearings onto the springs, wherein placing each of the plurality of bearings comprises contacting at least one respective spring with the bearing, wherein each bearing comprises two pads and a connector connecting the two pads, and wherein a maximum thickness of the pads is greater than a maximum thickness of the connector and a maximum width of the pads is greater than a maximum width of the connector; and
 inserting the housing of the lens cell into a cam tube.

18. The method of claim 17, wherein each of the bearing areas comprise a bearing recess and placing the plurality of springs into the plurality of bearing areas comprises placing the plurality of springs into the plurality of bearing recesses.

19. The method of claim 17, further comprising compressing the springs before inserting the housing of the lens cell into the cam tube.

* * * * *

UNITED STATES PATENT AND TRADEMARK OFFICE
CERTIFICATE OF CORRECTION

PATENT NO. : 10,180,559 B2  
APPLICATION NO. : 15/163575  
DATED : January 15, 2019  
INVENTOR(S) : John Nolan and Sean L. Delaney

Page 1 of 1

It is certified that error appears in the above-identified patent and that said Letters Patent is hereby corrected as shown below:

In the Claims

In Claim 1, Column 14, Line 15, change "comprising at least two pads" to --comprising two pads--.

Signed and Sealed this  
Twenty-sixth Day of February, 2019

Andrei Iancu  
*Director of the United States Patent and Trademark Office*